United States Patent [19]

Matsumoto et al.

[11] Patent Number: 5,726,954

[45] Date of Patent: Mar. 10, 1998

[54] OPTICAL RECORDING METHOD AND APPARATUS

[75] Inventors: Hiroyuki Matsumoto, Tokyo; Shinichi Kurita; Koichiro Ishii, both of Kanagawa; Masashi Horikawa, Tokyo, all of Japan

[73] Assignee: Nikon Corporation, Tokyo, Japan

[21] Appl. No.: 629,092

[22] Filed: Apr. 8, 1996

[30] Foreign Application Priority Data

| Apr. 10, 1995 | [JP] | Japan | 7-083628 |
| Apr. 10, 1995 | [JP] | Japan | 7-083629 |
| Jun. 15, 1995 | [JP] | Japan | 7-149173 |
| Jun. 15, 1995 | [JP] | Japan | 7-149174 |
| Jul. 4, 1995 | [JP] | Japan | 7-168591 |
| Jul. 4, 1995 | [JP] | Japan | 7-168592 |

[51] Int. Cl.$^6$ ................................. G11B 11/00
[52] U.S. Cl. .......................... 369/13; 369/116; 369/54
[58] Field of Search ........................ 369/13, 14, 116, 369/54, 58; 360/59, 114; 365/122

[56] References Cited

U.S. PATENT DOCUMENTS

| 5,239,524 | 8/1993 | Sato et al. ................... 369/13 |
| 5,335,213 | 8/1994 | Fukumoto et al. ............. 369/13 |
| 5,337,305 | 8/1994 | Hashima et al. .............. 369/116 |
| 5,390,162 | 2/1995 | Fukumoto et al. ............ 369/116 |
| 5,398,227 | 3/1995 | Miyaoka et al. ............. 369/116 |
| 5,410,527 | 4/1995 | Ashinuma .................... 369/13 |
| 5,475,666 | 12/1995 | Ito et al. ................. 369/116 |
| 5,615,182 | 3/1997 | Murakami et al. ............. 369/13 |

FOREIGN PATENT DOCUMENTS

| 0 430 649 A2 | 6/1991 | European Pat. Off. . |
| 0 446 892 A2 | 9/1991 | European Pat. Off. . |
| 0 469 727 A1 | 2/1992 | European Pat. Off. . |
| 0 504 829 A2 | 9/1992 | European Pat. Off. . |
| 0 556 046 A1 | 8/1993 | European Pat. Off. . |

*Primary Examiner*—Tan Dinh
*Attorney, Agent, or Firm*—Oliff & Berridge, PLC

[57] ABSTRACT

A method and apparatus for recording data on a magnetooptical recording medium finds an optimum laser beam intensities for recording. The method and apparatus do not cause a low level $P_L$ setting to become excessively low and poor overwriting of data during overwrite recording. Recording can be accomplished changing low level and high level laser beam intensities, while holding the ratio of the low level and high level laser beam intensities constant. Data can be reproduced and evaluated. When the optimum laser beam intensities have not been determined, the intensity ratio of the low level and high level intensities can be altered. After data has been is reproduced and evaluated, the process can be repeated, until the optimum laser beam intensities are obtained. Further, recording can be based on temperature of the recording medium and surroundings to obtain optimum laser beam intensities.

5 Claims, 8 Drawing Sheets

OPTICAL RECORDING METHOD AND APPARATUS

BACKGROUND OF THE INVENTION

1. Field of the Invention

The present invention relates to a control and method for recording data on an overwritable optical recording medium. The control and method effectively replace previously recorded data, regardless of the location of the data on the recording medium.

2. Description of Related Art

In recent years, optical recording and retrieval methods have become well known. These optical recording and retrieval methods satisfy a variety of needs, such as: high density; large capacity; high access speed; and high recording; and retrieval speeds. Also, the recording devices, retrieval devices and recording media, which employ the above optical recording and retrieval methods, have become more well-known.

There are several known optical recording and retrieval methods. These include optical recording and retrieval methods that: 1) form holes in the recording medium using heat; 2) change phases; and 3) use magnetooptical principles. Phase change and magnetooptical methods can 1) replace data after data has been recorded; 2) record new data; and 3) repeat the process numerous times. These phase change and magnetooptical methods are widely used, for example, such as in external memories for computers and consumer audio equipment.

Until recently, it has been impossible to replace or "overwrite" previously recorded data with optical and retrieval methods. Overwriting consists of recording new information on a medium that has data already been recorded on without first replacing the data, i.e., the data is essentially replaced by overwriting. However, an optical recording method has been proposed where overwriting is achieved by modulating the intensity of a beam that irradiates a recording medium. The modulation is based on the digitized data that will be recorded. Further, overwritable optical recording media and recording devices, which are capable of overwriting using the above methods, are also known. For example, U.S. Pat. No. 5,239,524 (equivalents include Japanese Laid-Open Patent Publication Sho 62-175948 and DE 3,619,618A1) disclose this type of overwriting magnetooptical recording methods.

In U.S. Pat. No. 5,239,524, the contents of which are fully incorporated herein, an overwritable or magnetooptical recording medium is used in magnetooptical recording and retrieval. The magnetooptical medium comprises a plurality of magnetic layers, each layer having at least one perpendicularly arranged magnetic layer as the recording layer. The magnetic layer is comprised of any suitable material, such as, for example, amorphous TbFe, TbFeCo, GdFe, GdFeCo, DyFe, or DyFeCo, and the like.

The recording medium used in the magnetooptical recording of U.S. Pat. No. 5,239,524 is an overwritable multi-layer magnetooptical recording medium containing a memory layer or M layer that functions as a recording and retrieval layer, and a supplementary recording layer or W layer. The memory layer M comprises a vertically magnetizable magnetic film. The supplementary recording layer W also comprises a vertically magnetizable magnetic film. Therefore, the data, which is usually stored on both the supplementary recording layer W and the memory layer M, for example stored as bits, can be exchange-coupled, as explained in U.S. Pat. No. 5,239,524, if desired. During a room temperature exchange-couple process, the magnetic orientation of data on the memory layer M does not change, and the magnetization of the data on the supplementary recording layer W will be oriented in a preset orientation as the auxiliary recording layer W has a lower holding power force or coercivity Hc at room temperature, and a higher curie point Tc, than the memory layer M, as discussed in U.S. Pat. No. 5,239,524.

Further, data can be recorded on the memory layer M, and possibly also on the auxiliary recording layer WO. The recording of data on the separate layers is conducted by the data being magnetized in the vertical direction or "A" orientation, and data being magnetization in an opposite direction or "anti-A" orientation, as discussed in U.S. Pat. No. 5,239,524. The magnetooptical recording medium permits the magnetic orientation of the auxiliary recording layer W to be aligned in a single direction by a magnetic field means, for example such as an initializing auxiliary magnetic field, Hini. The magnetic orientation of the memory layer M is not reversed at this time. Furthermore, the magnetic orientation of the auxiliary recording layer W, which has been previously aligned in a single direction, is not reversed, even under the exchange-coupling force exerted by the memory layer M. The magnetic orientation of the memory layer M is not reversed, even under an exchange-coupling force exerted by the auxiliary recording layer W.

With the magnetooptical recording method as discussed in U.S. Pat. No. 5,239,524, only the magnetic orientation of the auxiliary recording layer W is aligned in a single direction by magnetic field means prior to recording data. Additionally, a laser beam, which has its pulse modulated based on digitized data, irradiates the recording medium, where the laser beam intensity is varied between a high level $P_H$ and a low level $P_L$, as explained in U.S. Pat. No. 5,239,524. These levels correspond to a high and low level of the laser beam's pulse. The low level is higher than a retrieval level $P_R$ with which the medium is irradiated during a retrieval step.

As discussed in U.S. Pat. No. 5,239,524, the laser is turned on at an "extremely low level" to access a predetermined recording location on the medium, even when recording is not going to occur. This extremely low level is the same as or very close to the retrieval level $P_R$. When a low level laser beam irradiates the recording medium at a temperature, the magnetic orientation of the auxiliary recording layer W does not change. The magnetic orientation of the memory layer M is affected to remove any magnetic barriers between the memory layer M and the auxiliary recording layer W. This is a low temperature process, and the temperature range at which this low temperature process occurs is a low temperature process temperature $T_L$.

On the other hand, at a higher temperatures where a high level laser beam irradiates the recording medium, the magnetic orientation of the auxiliary recording layer W becomes aligned with the direction of the recording magnetic field. The magnetic orientation of the memory layer M is affected to remove any magnetic barriers between the memory layer M and the auxiliary recording layer W. This is called a high temperature process, and the temperature range at which this high temperature process occurs is called a high temperature process temperature $T_H$.

After irradiation by the laser beam, the magnetic orientation of the auxiliary recording layer W, which had been aligned with the direction of the recording magnetic field by high level laser beam irradiation, is realigned with the magnetic orientation of the recording magnetic field. Accordingly, if the magnetic orientation of the magnetic field means and the magnetic orientation of the recording field are opposed, it is possible to repeatedly record or overwrite on the memory layer, even if data has been previously recorded. This is the principle of light modulation magnetooptical recording. In other words, the recorded data or bits are formed by high level laser beam irradiation, and the data or bits are replaced by low level laser beam irradiation. Thus, the new data replaces or "overwrites" of the old data.

To optimize the length and thickness of the mark of the signal pulse when recording on an optical recording medium, the optimum laser beam intensities should be set based on a temperature of the recording medium and a temperature of the environment. This process of finding the optimum laser beam intensities is called test recording. There are known magnetooptical disk recording apparatuses that conduct test recordings using different methods. On conventional optical recording media, which cannot be overwritten, i.e., non-overwrite media, test recording is conducted by causing the intensities to change, while keeping the ratio of the two values of laser beam intensities constant. Thus, the optimum laser beam intensities are can be determined.

However, with optical intensity modulation overwrite recording, a low level laser beam intensity $P_L$ is involved in both recording and overwrite recording. Accordingly in non-overwrite media, by only changing the intensities while keeping the ratio of the two laser beam intensities constant, the low level $P_L$ is set too low. Accordingly, poor replacing results during overwrite recording.

SUMMARY OF THE INVENTION

It is one objective of the invention to resolve the above-noted problems and determine optimum laser beam intensities for overwrite recording. The optimum laser beam intensities can be found without poor overwriting of data, by considering the sequence of test recording.

The invention achieves its objects by providing an optical recording method where data is recorded on an overwritable optical recording medium by modulating a laser beam intensity. Test recording is performed on the optical recording medium while maintaining a low level laser beam intensity at a predetermined value and changing only a high level laser beam intensity. After this, data, which was test recorded, is reproduced. Accordingly, an optimum recording laser beam intensity is determined. The optical recording medium can be a magnetooptical recording medium, which contains two or more magnetic recording layers that are mutually exchange-coupled.

The invention achieves another of its objects by providing an optical recording apparatus where data is recorded on an overwritable optical recording medium by modulating a laser beam intensity. The optical recording apparatus comprises means for recording while maintaining a low level laser beam intensity at a predetermined value, and changing only a high level laser beam intensity.

A further object of the invention is achieved by providing an optical recording method where data is recorded on an overwritable optical recording medium by modulating a laser beam intensity. The method includes detecting the temperature of the optical recording medium, and conducting a test recording while maintaining a low level laser beam intensity, which was set by the detected temperature value, while changing a high level leaser beam intensity. After this, data is reproduced and evaluated. Thus, optimum laser beam intensities can be obtained. The optical recording medium can be a magnetooptical recording medium, which contains two or more magnetic recording layers that are mutually exchange-coupled.

Yet a further object of the invention is achieved by providing an optical recording apparatus where data is recorded on an overwritable optical recording medium by modulating a laser beam intensity. The optical recording apparatus comprises detection means for detecting the temperature of the optical recording medium; means for controlling a low level laser beam intensity based on the detected temperature; and modulation means for changing a high level laser beam intensity, without changing a low level laser beam intensity.

A still further object of the invention is achieved by providing an optical recording method where data is recorded on an overwritable optical recording medium. The method includes changing low level and high level recording laser beam intensities, while keeping the ratio of the low level and high level recording laser beam intensities constant. After recording, the data is reproduced and evaluated. Thus, it can be determined whether the recording laser beam intensity is at an optimum intensity. If not, an intensity ratio of the low level and the high level is altered, and the process is conducted again, and repeated until optimum laser beam intensities are obtained. The optical recording medium is a magnetooptical recording medium and contains two or more magnetic recording layers that are mutually exchange-coupled. Moreover, the low level and high level laser beam intensities ratio is initially set by low level and high level recording laser beam intensity data recorded on the optical recording medium at least for one temperature.

Furthermore, another object of the invention is achieved by providing an optical recording method for recording data on an overwritable optical recording medium. The method comprises recording by changing high level and low level laser beam intensities, while keeping a ratio $\alpha_0$ of a preset low level $P_{L0}$ and a preset high level $P_{H0}$ constant. This data is reproduced and evaluated. The optimal low level $P_{L1}$ and high level $P_{H1}$ are determined. Next, the optimum intensity ratio $\alpha$ of the low level and the high level is determined using this high level intensity $P_{H1}$, and recording is accomplished by changing the low level and high level laser beam intensities together while maintaining the intensity ratio $\alpha$ constant. The data is reproduced and evaluated to obtain an optimum laser beam intensities. The optimum intensity ratio $\alpha$ is found using the equation:

$$\alpha = \alpha_0 \times P_{H1}/(P_{H0} \times (1-\alpha_0) + \alpha_0 \times P_{H1}).$$

Still, a further object of the invention is achieved by providing an optical recording method for recording data on an overwritable optical recording medium, where optimum recording laser beam intensities are determined by conducting a test that changes a low level and high level laser beam intensity ratio based on a surrounding temperature. The optical recording medium is a magnetooptical recording medium containing two or more magnetic recording layers which are mutually exchange-coupled". The high level and low level laser beam intensity ratio is set as:

$$\alpha = (T_H - T_R)/(T_L - T_R)$$

where $T_L$ is a low temperature process temperature of the optical recording medium, $T_H$ is a high temperature process temperature, and $T_R$ is a surrounding temperature. The data concerning the low level and high level laser beam intensity ratio has been previously recorded as well as data concerning the low level and high level laser beam intensity ratio at a plurality of recording medium temperatures.

Another object of the invention is achieved by providing an optical recording method where data is recorded on an overwritable optical recording medium by modulating a laser beam intensity. The optimum recording beam intensity is determined by multiplying the high level and low level beam intensities by revision coefficients which are determined by conducting test recordings on the optical recording medium. The revision coefficients are larger than one for an inner circumference and smaller the farther away from the circumference. The optical recording medium uses a magnetooptical recording medium containing two or more recording layers, which are mutually exchange-coupled.

A still further object of the invention is achieved by providing an optical recording method for recording data on an overwritable optical recording medium by modulating a laser beam intensity. A test recording is conducted on a test recording area of an optical recording medium test. Recording is re-conducted with the same laser beam intensities as in the test recording at the test recording area, without replacing the data on the test recording area. The data, which has been test recorded, is reproduced and evaluated. Thus, an optimum recording beam intensities can be determined. The optical recording medium uses a magnetooptical recording medium containing two or more recording layers which are mutually exchange-coupled. The data in the test recording area can be replaced prior to the test recording.

Further, another object of the invention is achieved by processing an optical recording method, where data is recorded on an overwritable optical recording medium by modulating a laser beam intensity. The method includes test recording after replacing the data on the test recording area of an optical recording medium. The data that is then test recorded is reproduced and evaluated. After this, the test recording is re-conducted at the same recording laser beam intensities, without replacing the data at the area and the data, is reproduced and evaluated. The optimum recording beam intensities is then determined from the two evaluation results. The optical recording medium uses a magnetooptical recording medium containing two or more recording layers which are mutually exchange-coupled. If the two evaluation results differ, the low level laser beam intensity is shifted to a higher level and a high level laser beam intensity is shifted to a lower level. These values are then set as the optimum recording beam intensities.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
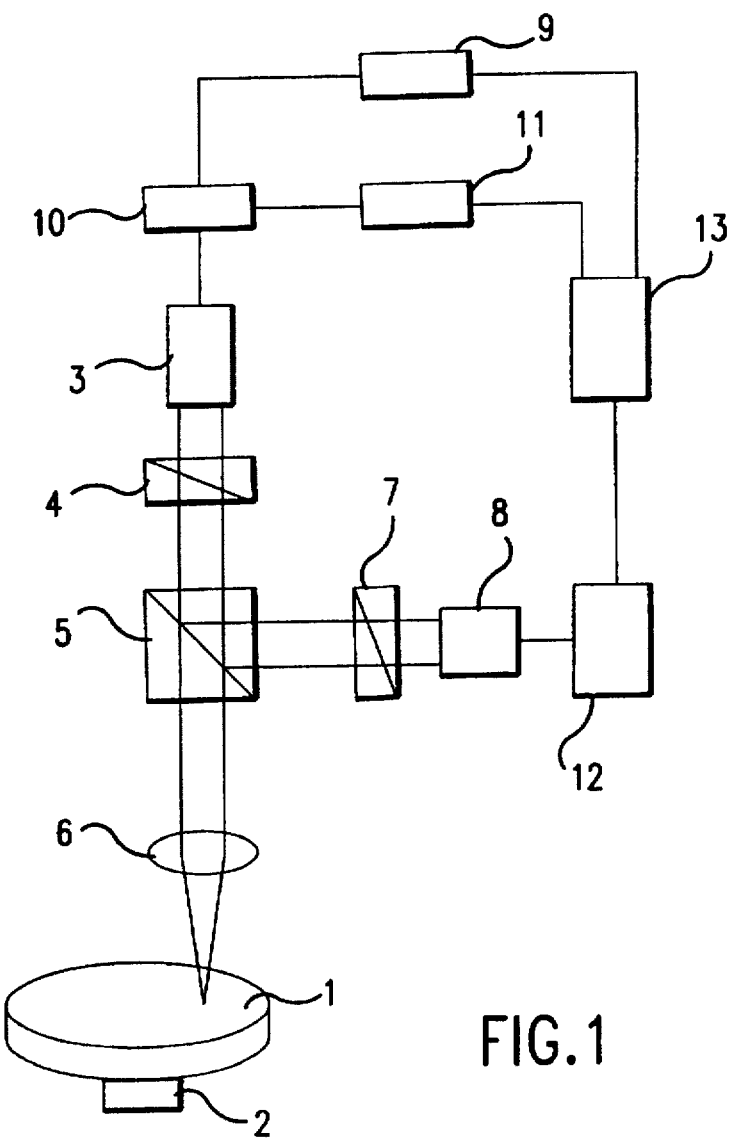
FIG. 1 is a block diagram of an optical recording method and apparatus according to a first preferred embodiment of the invention.

An optimum intensity ratio $\alpha$ of high level and low level laser beam intensities is determined from equation (1):

$$\alpha = (T_H - T_R)/(T_L - T_R) \tag{1}$$

where $T_L$ is a low temperature process temperature of the optical recording medium, $T_H$ is a high temperature process temperature, and $T_R$ is a surrounding temperature. Because temperatures $T_L$, $T_H$ and $T_R$ are influenced by the environmental temperature, $\alpha$ changes with the temperature of the recording medium. For example, if the temperature of the recording medium changes, $\alpha$ also changes. However, the recording medium moves at high speeds, so it is difficult to constantly measure the temperature of the medium by contacting a thermometer. Consequently, a method where the temperature of the medium is intermittently estimated and $\alpha$ is subsequentially determined can be used. For example, the temperature of a region close to or proximate the medium is measured, and $\alpha$ can be determined from this temperature.

Since it is difficult to measure $T_L$ and $T_H$, it is preferable to record the initially set intensity ratio when conducting a test recording on a medium. For example, test recording is accomplished at a high level $P_{H0}$, a low level $P_{L0}$ and a ratio $\alpha_0$ at a present temperature $T_R$ of the medium. Furthermore, with the high level $P_{H1}$ to be the optimum of these values, the optimum intensity ratio $\alpha$ is determined as a result of the test recording, as follows.

First, a coefficient of heating $\beta$ by irradiation from a laser beam of the recording medium, which is related to a high temperature process temperature $T_H$. The high temperature process temperature $T_H$ is expressed in terms of the rise in temperature caused by the high level laser beam intensity $P_{H0}$ as:

$$T_H = \beta P_{H0} + T_{R0} \tag{2}$$

Similarly, a low temperature process temperature $T_L$ is expressed as:

$$T_L = \beta P_{L0} + T_{R0} = \beta/\alpha_0 \times P_{H0} + T_{R0} \tag{3}$$

Conversely, the temperature $T_R$ of the medium is found from equation (2), and is expressed as:

$$T_R = \beta(P_{H0} - P_{H1}) + T_{R0} \tag{4}$$

Hence, the optimum intensity ratio $\alpha$ is expressed as:

$$\alpha = (\alpha_0 P_{H1})/(P_{H0}(1-\alpha_0) + \alpha_0 P_{H1}) \tag{5}$$

The intensity ratio found in equation (5) is reset and test recording can be re-conducted. The optimum combination low level $P_L$ and high level $P_H$ are then determined.

Hereafter, the invention is described more concretely through preferred embodiments, but these are intended to be illustrative and not limiting.

In the illustrated preferred embodiments, a control is implemented to perform the methods and can be a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented-using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in the Figures can be used as the controller. As shown, a distributed processing architecture is preferred for maximum data/signal processing capability and speed.

FIG. 1 illustrates a block diagram of an optical recording apparatus.

A magnetooptical disk 1 on which overwriting is possible through optical modulation is prepared. The magnetooptical disk 1 rotates at a constant speed by a suitable drive, such as a disk driving means 2 in a recording and reproduction apparatus. A laser beam is emitted from the laser 3. The laser beam is used in recording and reproduction. The laser 3 is driven by an LD driver 10. The laser beam is linearly polarized light after passing through a polarizer 4.

The laser beam passes through a beam splitter 5 and is condensed onto a recording layer of the magnetooptical disk 1 by a condenser lens 6. The laser beam is reflected by the recording layer of the magnetooptical disk 1, and passes back through the condenser lens 6. The laser beam is then reflected by the beam splitter 5, and passes through a light detector 7. The beam is then converted into an analog electrical signal by a data detector or data detector means 8. Thus, the reproduction of the data is complete.

The operation of test recording will now be described. The magnetooptical disk 1 is positioned in the optical recording and reproduction apparatus. The disk 1 rotated at a constant speed. A test recording control unit 13 causes a pattern of alternating repeating short marks and long marks to be created by a recording waveform creating unit 9. These alternating long and short marks are used for text recording.

Under the control of the test recording control unit 13, a recording laser beam intensity is set in the LD driver 10 by a test recording power register 11.

The laser 3 is operated, and test recording is accomplished by a laser beam irradiating the test recording area of the magnetooptical disk 1. Test recording is accomplished by changing a high level laser beam intensity $P_H$ in stages, while maintaining a low level laser beam intensity $P_L$ constant.

The data, which was recorded on the test recording area, is reproduced. An analog electric signal is created by the data detection means 8 and input into a determinator or determination means 12. The differences between a reproduced signal offset amount of the short mark repeating pattern and a reproduced signal offset amount of the long mark repeating pattern are detected for each high level laser beam intensity $P_H$ in the determination means 12.

Figure 2:
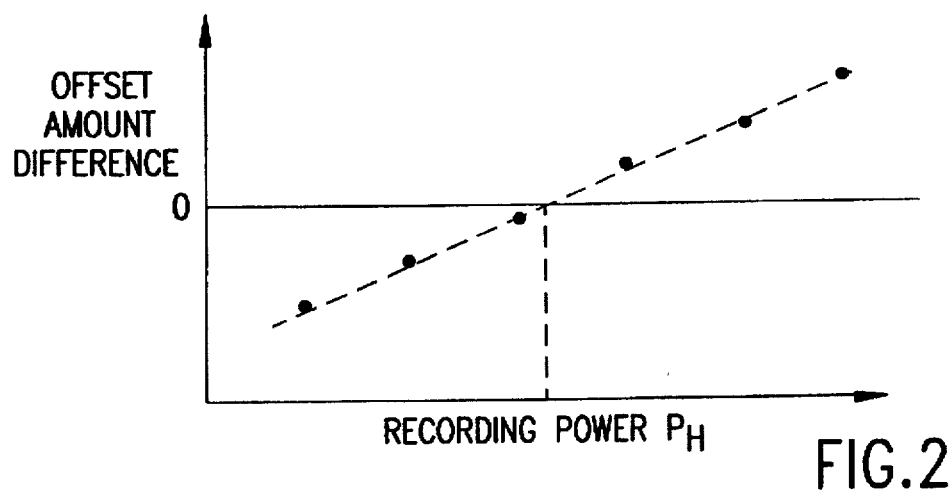
FIG. 2 is a graph illustrating the difference in offset amounts for a high level laser beam intensity $P_H$ of test recording.

The high level laser beam intensity $P_H$, where the difference between the offset amounts becomes zero (0), is determined. This is the optimum high level laser beam intensity. The procedure for determining the optimum intensity can be plotted, which is illustrated in FIG. 2.

The data concerning the low level laser beam intensity $P_L$ can be pre-recorded on the magnetooptical disk 1. Moreover, it is possible to set the data by reproducing the data prior to test recording.

Figure 3:
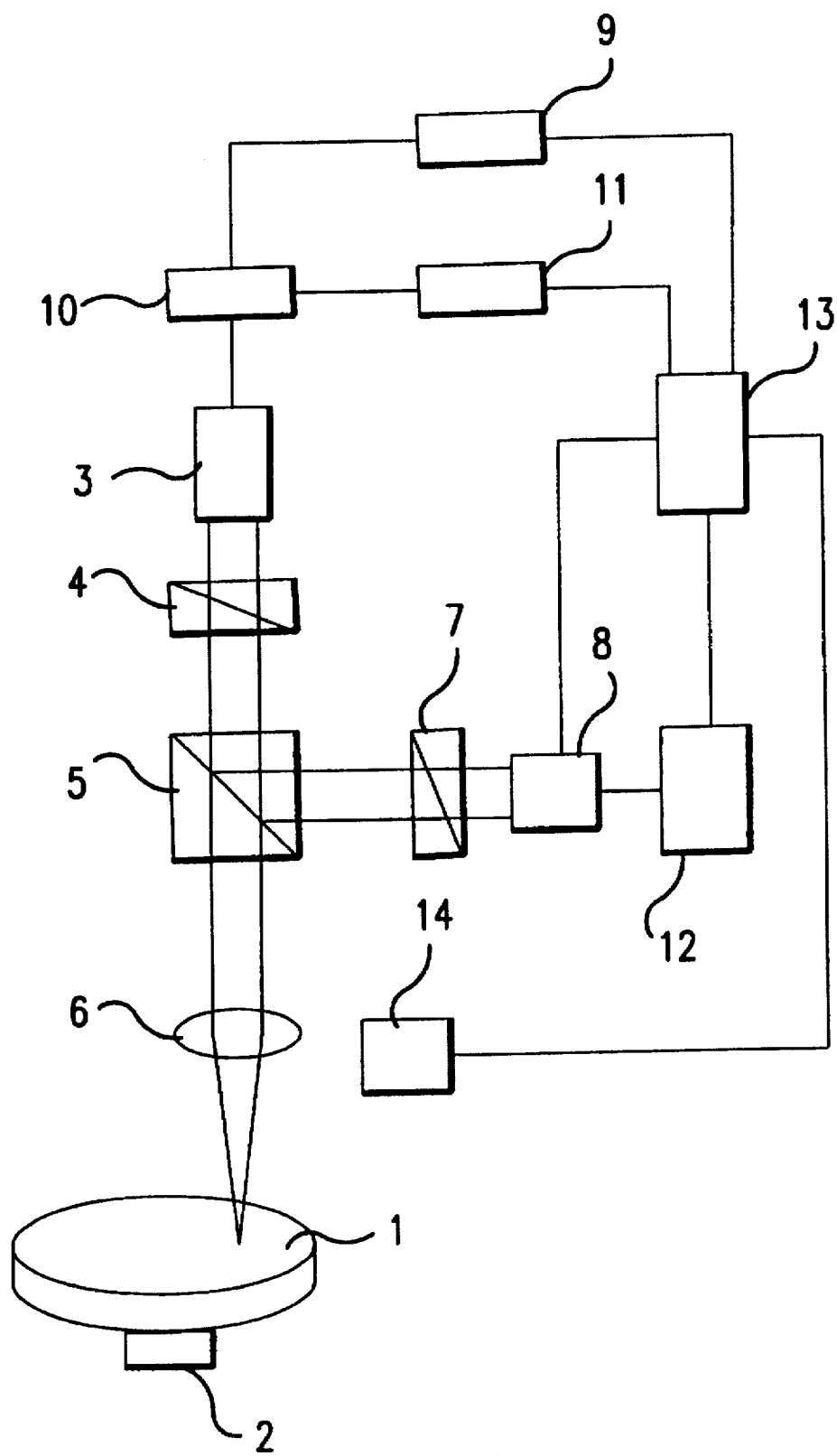
FIG. 3 is a block diagram of an optical recording method and apparatus according to a second preferred embodiment of the invention.

FIG. 3 is a block diagram of an optical recording apparatus according to a second preferred embodiment of the invention. Like elements of this and other preferred embodiments are represented by similar reference characters.

First, a magnetooptical disk 1 on which overwriting is possible by optical modulation is prepared. The magnetooptical disk 1 is partitioned into a plurality of recording zones, each having different recording frequencies. Data relating to a recording laser beam intensity for the plurality of recording zones at about 10° C. and about 40° C. is recorded in a preset area on the disk. For example, a portion of this recording area has optimum setting values of high level and low level laser beam intensities, for each of the zones when the disk temperature is about 10° C. and about 40° C., recorded thereon.

The magnetooptical disk 1 is rotated at a constant speed by a suitable drive, such as a disk driving means 2. The magnetooptical disk 1 is partitioned into the plurality of zones, each of which extend in a radial direction. A laser beam is emitted from the laser 3. The laser beam is used in recording and reproduction. The laser 3 is driven by an LD driver 10. The laser beam becomes linearly polarized light after passing through a polarizer 4.

The laser beam, which is linearly polarized, passes through a beam splitter 5, and is condensed onto a recording layer of the magnetooptical disk 1 by a condenser lens 6. The laser beam, which is then reflected by the recording layer of the magnetooptical disk 1, passes back through the condenser lens 6. The laser beam is reflected by the beam splitter 5, and passes through a light detector 7. The beam is then converted into an analog electrical signal by a data detector or detection means 8. Reproduction of the data is complete.

A temperature detector or detection means 14 is mounted close to the disk to detect temperatures. The temperature detection outputs the temperature data to a test recording control unit 13.

Next, the operation of test recording, according to a second preferred embodiment will be described. The magnetooptical disk 1 is positioned in a magnetooptical disk drive apparatus. The disk is rotated by the disk driving means 2. A bender area of the magnetooptical disk 1 is accessed by irradiating the disk 1 with the laser. The values of the low level powers at about 10° C. and about 40° C. on each recording zone are read.

After the magnetooptical disk 1 is in the optical disk recording and reproduction apparatus and has been rotated at a constant speed, the initially set values of the low level and high level laser beam intensities at 10° C. and 40° C. for each zone are read. The high level and low level laser beam intensities, which were initially set are again set in accordance with the temperature of the disk are detected by the temperature detection means 14 and the optimum set values are read from the disk. The test recording control unit 13 then controls a recording waveform creating unit 9 to generate a pattern of alternating repeating short marks and long marks, which are used for test recording. A recording laser beam intensity is set in the LD driver 10 by the test recording power register 11 through the control of the test recording control unit 13. The laser is then driven, and test recording is accomplished by the laser beam irradiating the test recording area of the magnetooptical disk. The test recording is accomplished by changing the high level laser beam intensity $P_H$ in stages, while holding the low level laser beam intensity $P_L$ constant.

The data, which was recorded on the test recording area, is reproduced. An analog electric signal, which is created by the data detection means 8, is then input into determination means 12. The differences between a reproduced signal offset amount of the short mark repeating pattern and a reproduced signal offset amount of the long mark repeating pattern are then determined for each high level laser beam intensity $P_H$.

The high level laser beam intensity $P_H$, where the difference between the offset amounts becomes 0, is determined. This is the optimum high level laser beam intensity. This procedure is illustrated in FIG. 2.

Figure 4:
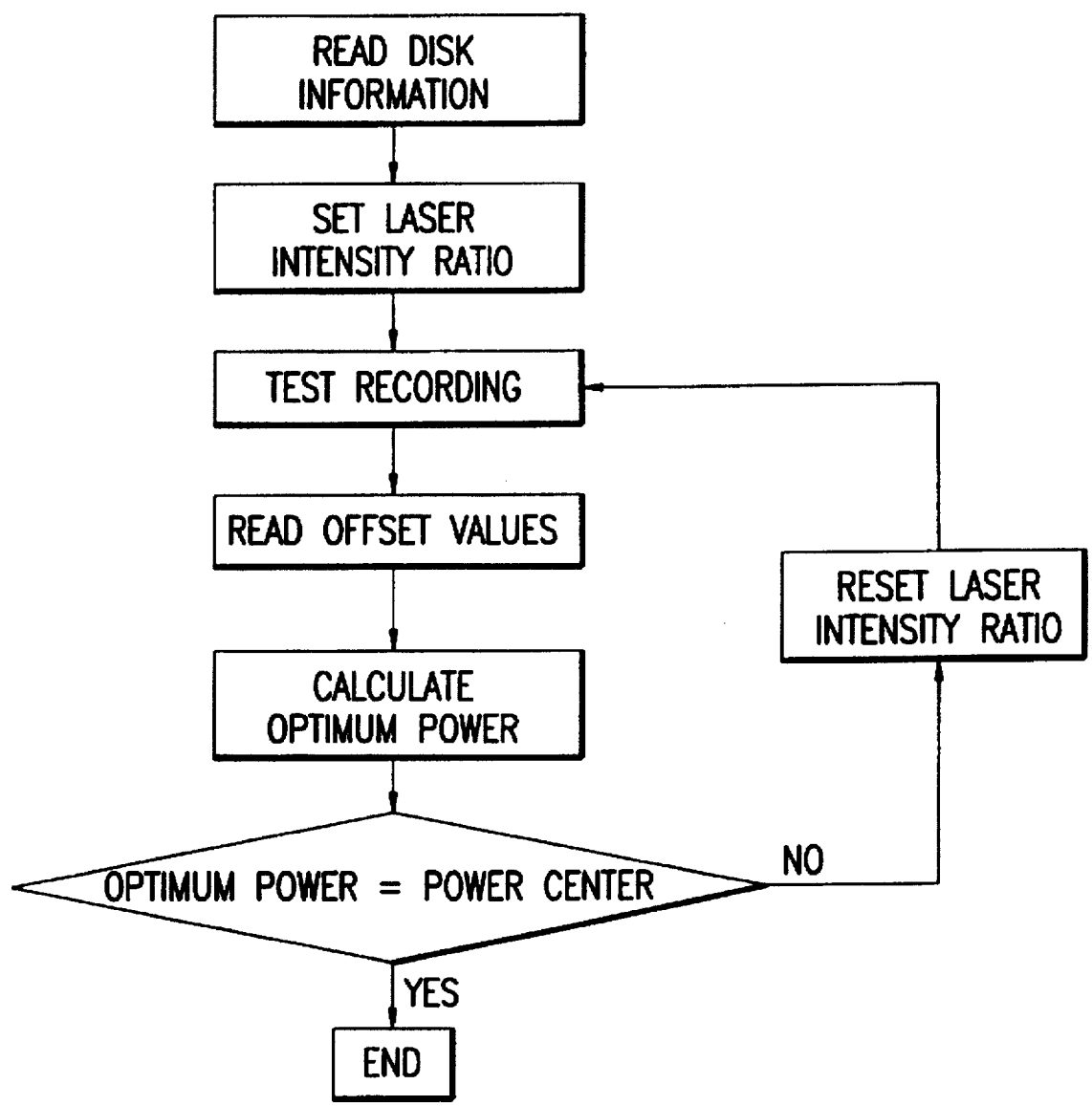
FIG. 4 is a flowchart of the optical recording method according to a third preferred embodiment of the invention.

FIG. 4 is a flowchart of an optical recording method according to a third preferred embodiment of the invention. This method is executed as follows.

First, a magnetooptical disk 1 on which overwriting is possible by optical modulation is prepared. The magnetooptical disk 1 is partitioned into a plurality of zones each having different recording frequencies. Data relating to a recording laser beam intensity at about 25° C. for the plurality of recording zones is recorded in a preset area of the disk 1.

The magnetooptical disk 1 is positioned in a recording and reproduce apparatus. Data relating to the recording laser beam intensity is read from the preset area of the disk. An intensity ratio $\alpha_0$ of low level and high level laser beam intensities is determined from this information read from the preset area.

A test recording is conducted by irradiating a test recording area of the disk with a laser beam, which has been modulated into an alternating intensity pattern consisting of alternately repeating continuous short marks and continuous long marks. The test recording is conducted by changing the low level and high level laser beam intensities in stages, without changing the intensity ratio $\alpha_0$.

The signal, which was test recorded, is then reproduced. The difference or offset amount between a center of amplitude of the reproduced signal for the continuous short marks and a center of amplitude of the reproduced signal for the continuous long marks is determined. A laser beam intensity which makes this offset amount 0, is determined, as in FIG. 2. The optimal high level and low level laser beam intensities at the intensity ratio $\alpha_0$ are then determined.

Test recording is re-conducted by altering high level and low level laser beam intensities based on a high level laser beam intensity, that had been determined. An optimum high level and low level laser beam intensities can then be determined. Through the above, a combination of recording laser beam intensities can be determined.

Figure 5:
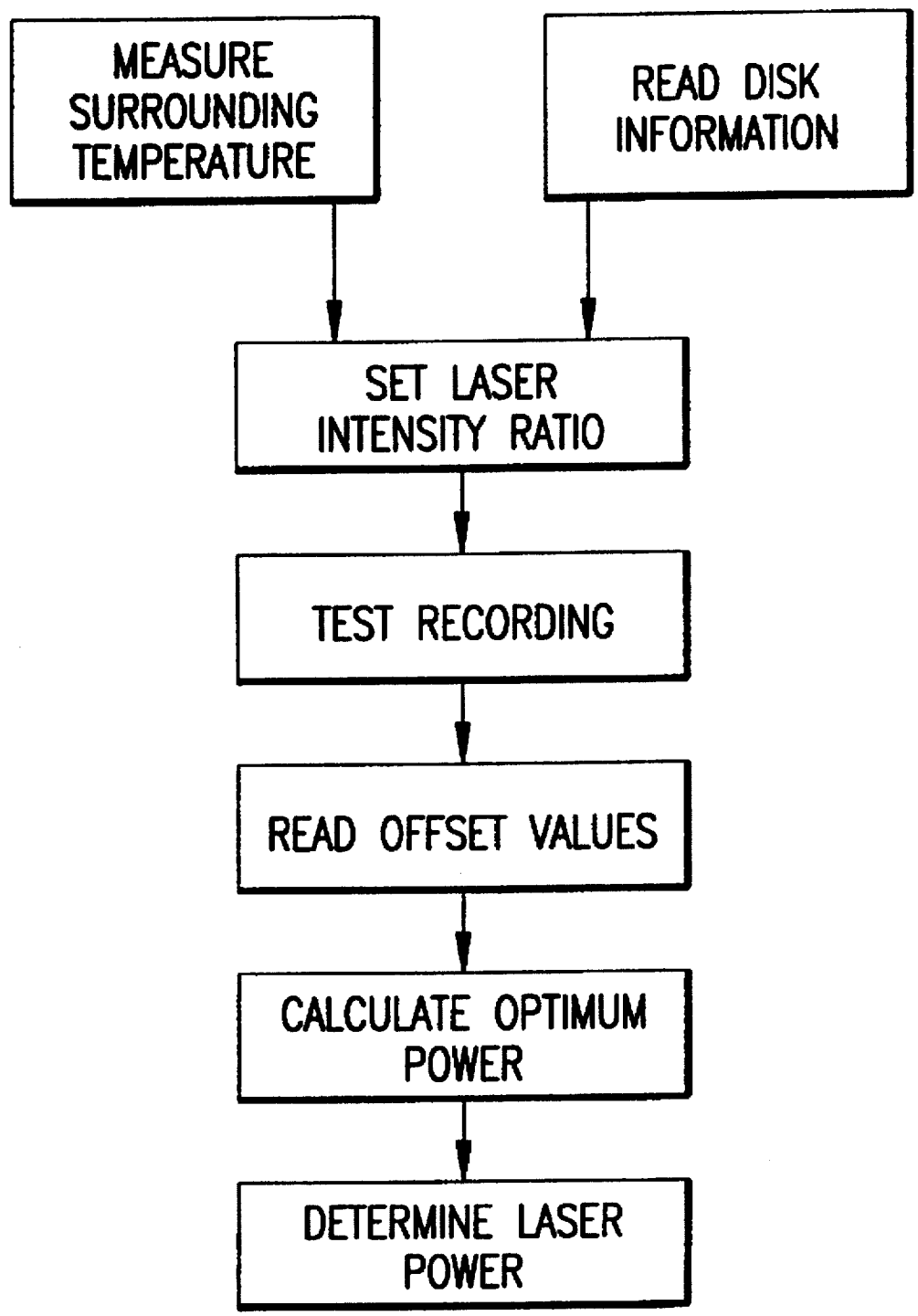
FIG. 5 is a block diagram of the optical recording method according to a fourth preferred embodiment of the invention.

FIG. 5 illustrates a flowchart for an optical recording method according to a fourth preferred embodiment of the invention. This method is conducted as follows.

First, a magnetooptical disk 1 on which overwriting is possible by optical modulation is prepared. The magnetooptical disk 1 is partitioned into a plurality of zones, each having different recording frequencies. Data relating to a recording laser beam intensity at about 10° C. and about 40° C. for the plurality of recording zones is recorded in a preset area of the disk 1.

The magnetooptical disk 1 is positioned in a recording and reproduction apparatus. Data relating to the recording laser beam intensity is read from the preset area of the surrounding temperature is measured. From these values, an intensity ratio of low level and high level laser beam intensities can be determined.

A test recording is conducted by changing the low level and high level laser beam intensities in stages, without changing the intensity ratio $\alpha_0$. The test recording is conducted on the basis of test recording patterns consisting of alternately repeating continuous short marks and continuous long marks.

Next, data, which was test recorded, is reproduced. A difference or offset amount between a center of amplitude of the reproduced signal for the continuous short marks and a center of amplitude of the reproduced signal for the continuous long marks is determined. A laser beam intensity, which makes this offset amount 0, is determined, as in FIG. 2. The high level and low level laser beam intensities can then be determined. Through the above, the combination of recording laser beam intensities is determined.

Another preferred embodiment of an optical recording method according to the invention is conducted as follows.

A magnetooptical disk 1 on which overwriting is possible by optical modulation is prepared. This magnetooptical disk 1 is partitioned into a plurality of zones, each having different recording frequencies. Data relating to a recording laser beam intensity in the plurality of recording zones at about 25° C. is recorded in a preset area on the disk.

The magnetooptical disk 1 is positioned in a recording and reproduction apparatus which includes an optical recording function. Data relating to a recording laser beam intensity, which is recorded in the preset area, is reproduced. The intensity ratio and central values for low level and high level laser beam intensities are determined from this data.

A test recording is conducted by changing the low level and high level laser beam intensities together in stages without changing the intensity ratio in the plurality of recording zones. The test recording uses a test recording pattern of alternately repeating continuous short and long marks.

The signal, which was test recorded in each zone, is then reproduced. The difference or offset amount between a center of amplitude of the reproduced signal for the continuous short marks and a center of amplitude of the reproduced signal for the continuous long marks is determined. A laser beam intensity, which makes the offset 0 is determined, as in FIG. 2. The high level and low level laser beam intensities are then determined.

Figure 6:
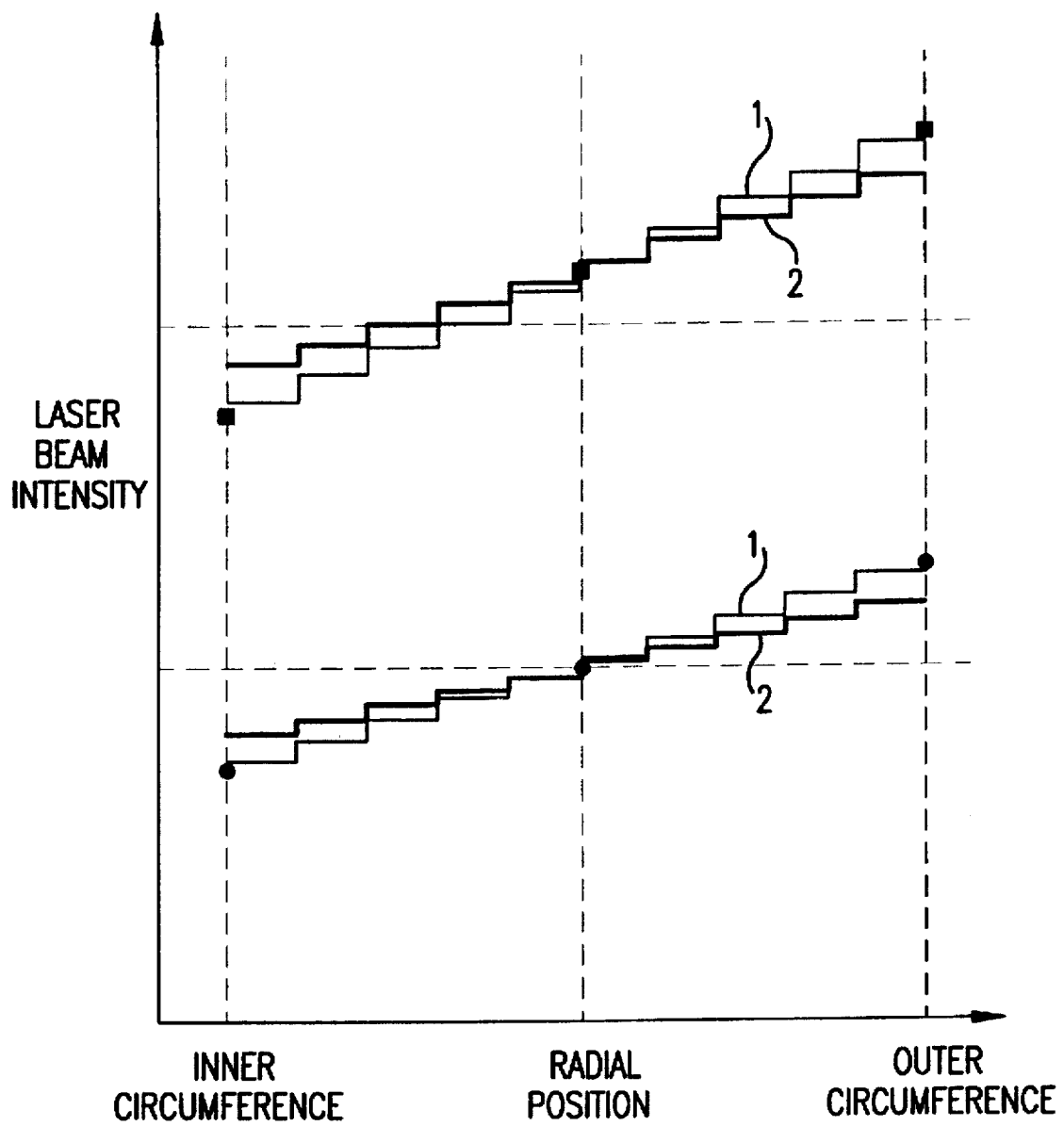
FIG. 6 is a graph illustrating a revised and detected intensity (1) for each zone on a disk found in test recording, and the intensity (2) of the optimum recording laser beam found by multiplying by a revision coefficient.

From the combinations of recording powers, a laser beam intensity for each zone is interpolated and determined. The intensity is indicated by (1) in FIG. 6. Next, data, which has been found by multiplying the intensities of (1) by predetermined revision coefficients is stored as optimum recording laser beam intensities. The revision coefficients are larger than one for an inner circumference and smaller than one for outer circumferences. These values are indicated by (2) in FIG. 6.

Figure 7:
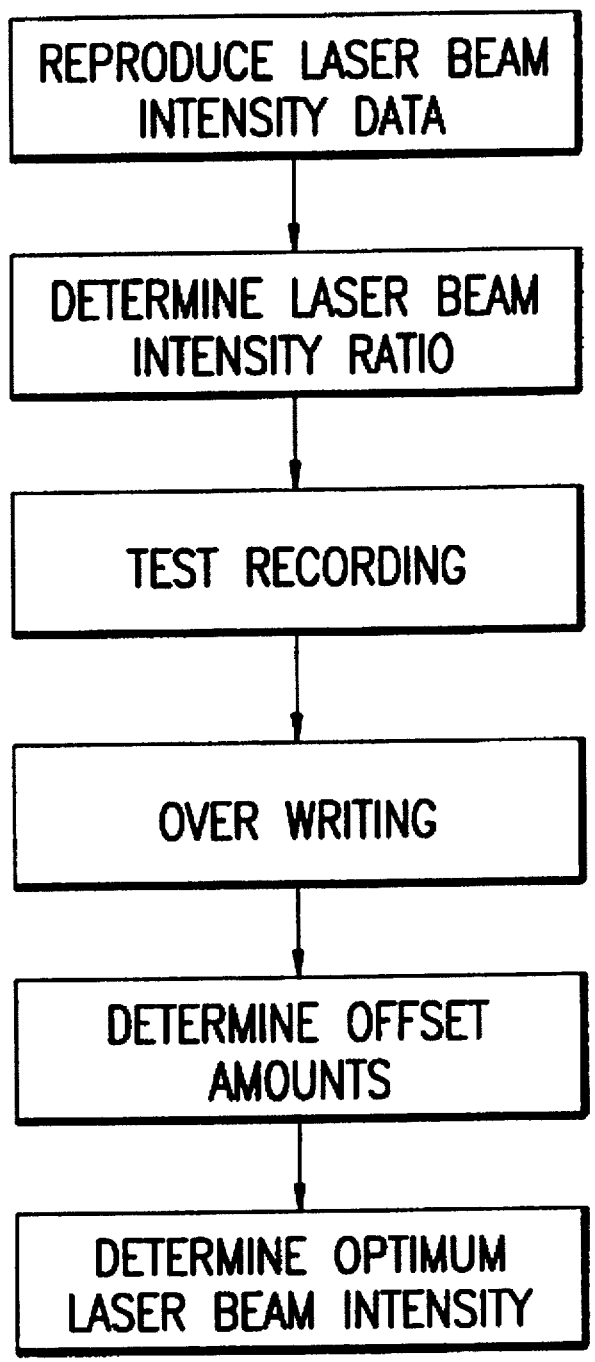
FIG. 7 is a flowchart of an optical recording method according to another preferred embodiment of the invention.

FIG. 7 is a flowchart for a optical recording method according to another preferred embodiment of the invention. This method is conducted as follows. A magnetooptical disk 1 on which overwriting is possible by optical modulation is prepared. The magnetooptical disk 1 is partitioned into a plurality of zones, each having different recording frequencies. Data relating to a recording laser beam intensity in the plurality of recording zones at about 25° C. is recorded in a preset area of the disk 1.

The magnetooptical disk 1 is positioned in a recording and reproduction apparatus having an optical recording function. Data relating to a recording laser beam intensity, which has been recorded in the preset area, is reproduced. From this data, an intensity ratio and central values for the low level and high level laser beam intensities are determined.

A test recording area is first overwritten or replaced. Then, test recording is conducted by changing the low level and high level laser beam intensities together in stages without changing an intensity ratio in the plurality of zones using a test recording pattern of alternately repeating continuous short and long marks.

Next, without overwriting or replacing the area where the test recording was conducted, a test recording is re-conducted by overwriting at the same area using the same laser beam intensity. The signal, which was test recorded, is reproduced. A difference or offset amount between a center of amplitude on the reproduced signal for the continuous short marks and a center of amplitude for the reproduced signal for the continuous long marks is determined. A laser beam intensity, which makes the offset amount 0, is determined, as in FIG. 2. The high level and low level laser beam intensities are then determined.

Figure 8:
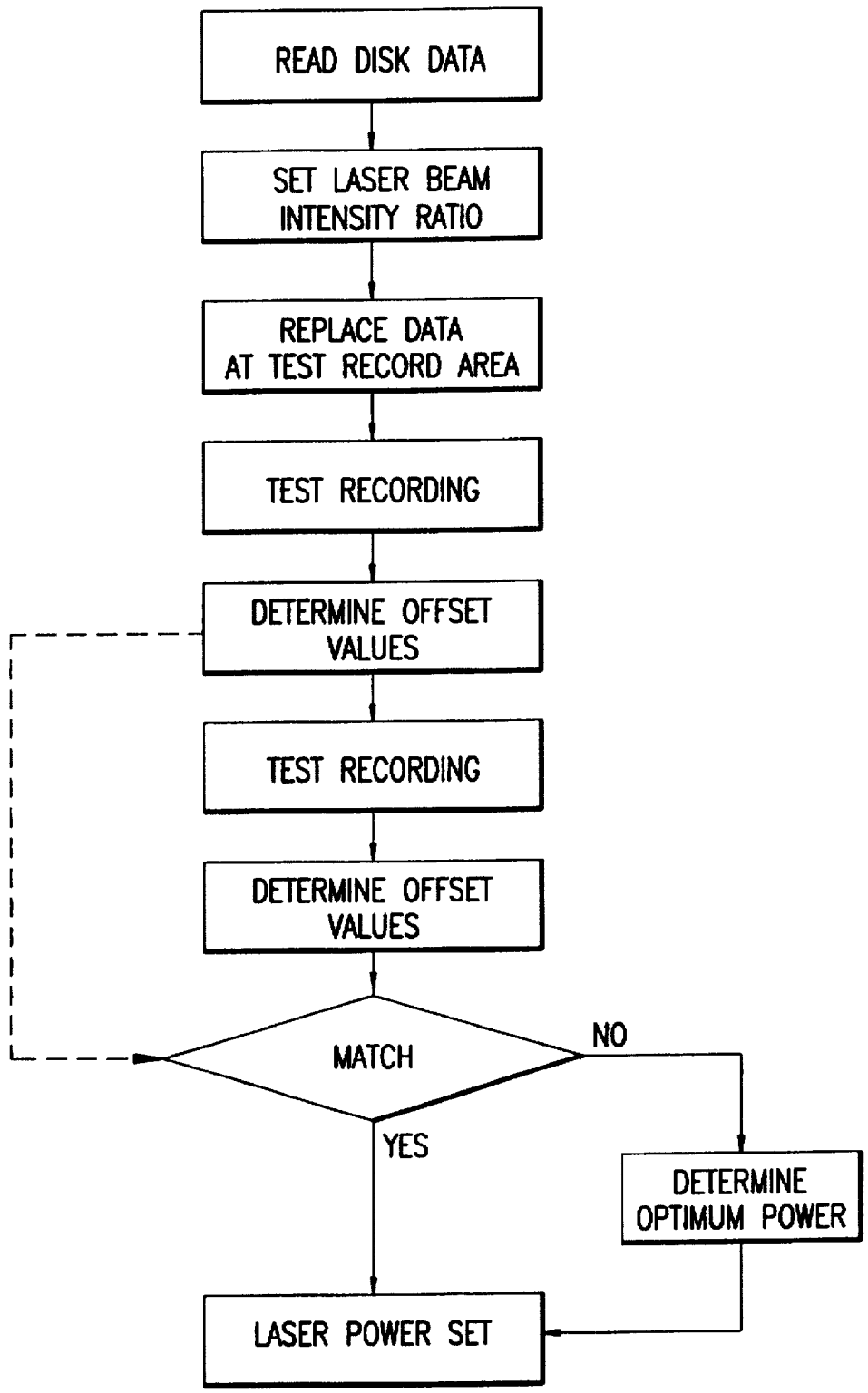
FIG. 8 is a flowchart of an optical recording method according to another preferred embodiment of the invention.

FIG. 8 is a flowchart for an optical recording method according to another preferred embodiment of the invention. This method is conducted as follows. First, a magnetooptical disk 1 on which overwriting is possible by light beam intensity modulation is prepared. The magnetooptical disk 1 is partitioned into a plurality of zones, each having different recording frequencies. Data relating to a recording laser beam intensity in the plurality of recording zones at about 25° C. is recorded in a preset area of the disk 1.

The magnetooptical disk 1 is positioned in a recording and reproduction apparatus. Data relating to a recording laser beam intensity, which has been recorded in the preset area, is reproduced. From this data, an intensity ratio and central values for the low level and high level laser beam intensities are determined.

A test recording area is overwritten or replaced one time. Then, a test recording is conducted by changing the low level and high level laser beam intensities together in stages, without changing an intensity ratio in the plurality of zones, using a test recording pattern of alternately repeating continuous short and long marks.

Next, without replacing data at the area where the test recording was conducted, test recording is re-conducted by overwriting at the same area using the same laser beam intensity. The signal, which was test recorded, is then reproduced. A difference or offset amount between a center of amplitude of the reproduce signal for the continuous short marks and a center of amplitude of the reproduced signal for the continuous long marks is determined. A laser beam intensity, which makes the offset value 0, is determined, as in FIG. 2.

Without replacing data at the area where the test recording was accomplished, a test recording is then re-conducted by overwriting at the same area with the same laser beam intensity. Test data, which had been recorded, is re-reproduced. A difference or offset amount between a center of amplitude of the reproduced signals for the continuous short marks and a center of amplitude of the reproduced signals for the continuous long marks is determined. The laser beam intensity, which makes the offset amount 0, is determined in the same manner.

When laser beam intensities are found to match twice, the intensity is determined as the optimum value. Thus, the offset amount becomes 0.

Figure 9:
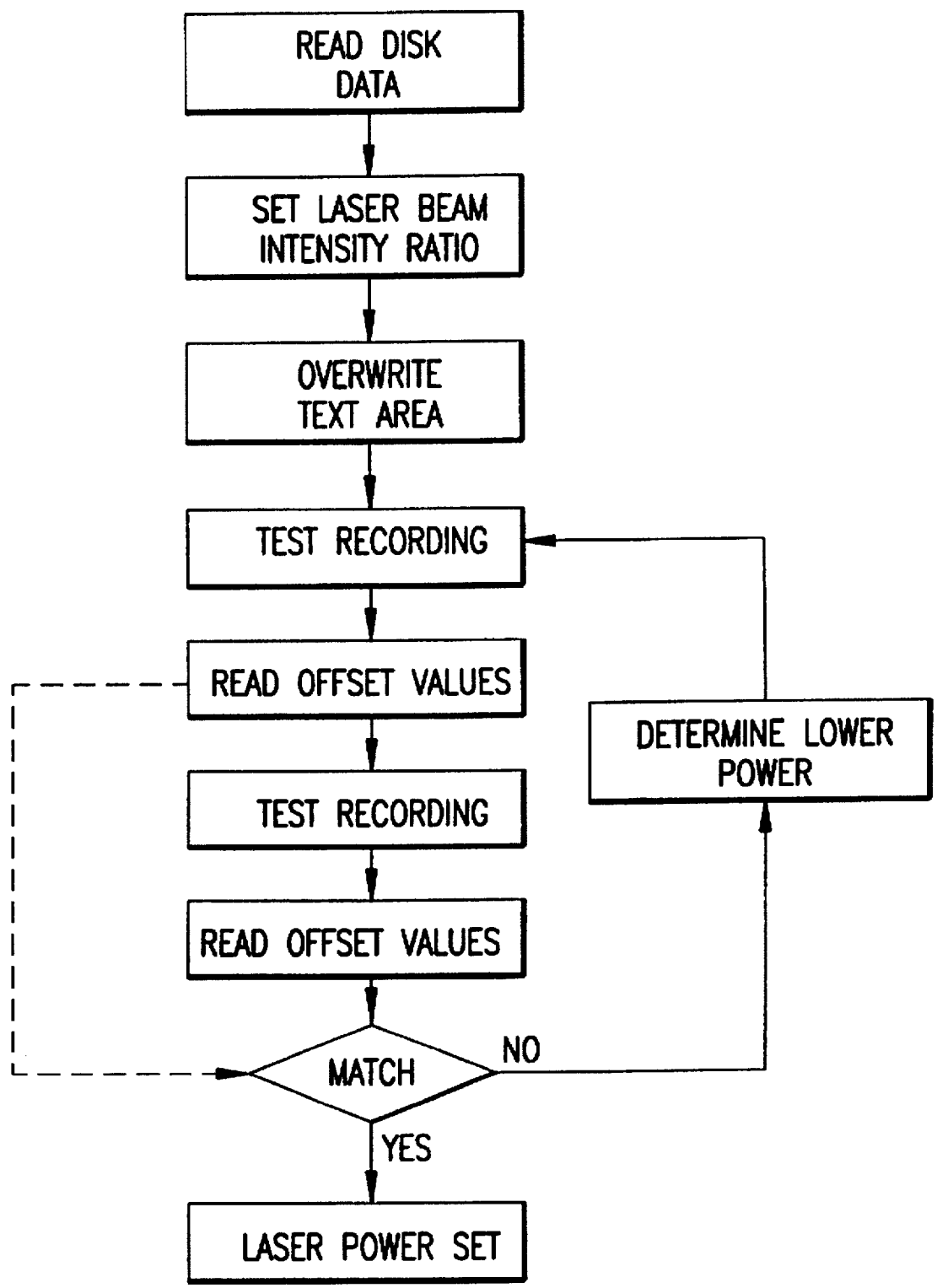
FIG. 9 is a flowchart of an optical recording method according to another preferred embodiment of the invention.

When laser beam intensities do not match twice, a determination is made that the replacement of data during overwriting is poor. However, there are several methods for determining an optimum recording laser beam intensity. For example, as shown in FIG. 9, a low level laser beam intensity can be shifted to a high side and a high level laser beam intensity can be shifted to a low side. These values are then set to be the optimum values. Thus, an offset value of around 5% the optimal value for each is desirable.

Addition, in still a further preferred embodiment of the invention, the intensity ratio of the low level intensity and high level intensity can be lower ends reset so that the low level intensity is larger. The optimum value is then found by re-conducting test recording.

With the above-described methods, the combination of high level and low level recording laser beam intensities can be determined. It is possible to provide an optical recording method where the low level setting is not excessively low. Further, poor replacement of data does not occur during overwrite recording in the case of recording on an optical disk with which light intensity modulation overwriting is possible.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed:

1. An optical recording method comprising:
   recording data on an overwritable optical recording medium by modulating a laser beam intensity;
   conducting a test recording of data on the optical recording medium while maintaining a low level laser beam intensity at a predetermined value and changing a high level laser beam intensity;
   reproducing the data, which was test recorded; and
   determining an optimum recording laser beam intensity by comparing the reproduced data with the test recording.

2. The method according to claim 1, wherein the optical recording medium comprises a magnetooptical recording medium that comprises at least two magnetic recording layers, which are adapted to be mutually exchange-coupled.

3. The method of claim 1, wherein the determining step further comprises selecting the high level laser beam intensity at which the test recording data and the reproduced data are substantially equal, as the optimum recording laser beam intensity.

4. The method of claim 1, wherein the test recording includes a pattern of alternating, repeating short marks and a pattern of alternating, repeating long marks.

5. The method of claim 3, wherein the determining step further comprises computing the differences between the reproduced short mark repeating pattern and the differences between the reproduced long mark repeating pattern for each high level intensity and selecting the optimum intensity where the differences of the short and long mark repeating patterns are zero.

* * * * *

UNITED STATES PATENT AND TRADEMARK OFFICE
CERTIFICATE OF CORRECTION

PATENT NO. : 5,726,954
DATED : March 10, 1998
INVENTOR(S) : Hiroyuki MATSUMOTO et al.

It is certified that error appears in the above-identified patent and that said Letters Patent is hereby corrected as shown below:

TITLE PAGE:
Item [30]     Foreign Application Priority Data

| Apr. 10, 1995 | [JP] | Japan | 7-083628 |
| Apr. 10, 1995 | [JP] | Japan | 7-083629 |
| Jun. 15, 1995 | [JP] | Japan | 7-149173 |
| Jun. 15, 1995 | [JP] | Japan | 7-149174 |
| Jul. 4, 1995 | [JP] | Japan | 7-168591 |
| Jul. 4, 1995 | [JP] | Japan | 7-168592 |
| Aug. 10, 1995 | [JP] | Japan | 7-204189 |

Signed and Sealed this

Thirty-first Day of October, 2000

*Attest:*

Q. TODD DICKINSON

*Attesting Officer*     *Director of Patents and Trademarks*